July 10, 1962  D. O. BARD  3,043,635
AIR BEARINGS
Filed Feb. 1, 1960  3 Sheets-Sheet 1
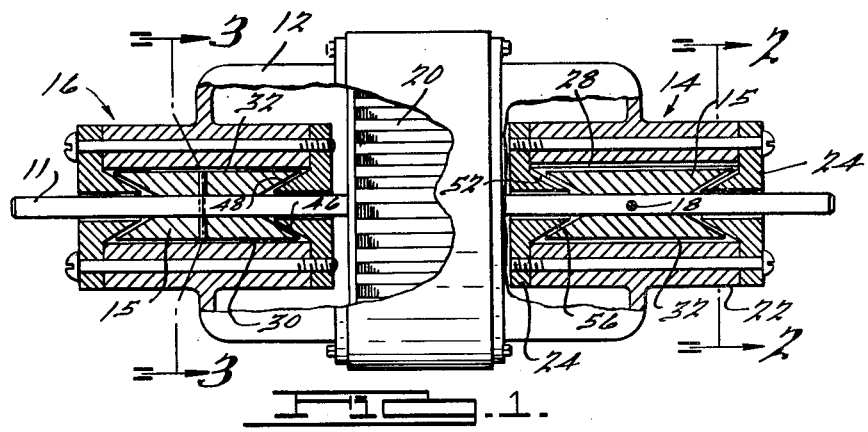
FIG. 1.
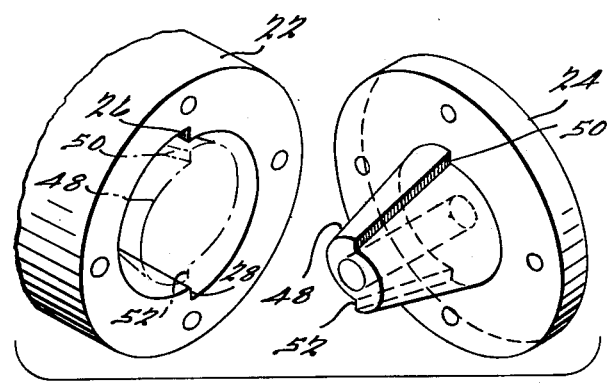
FIG. 4.
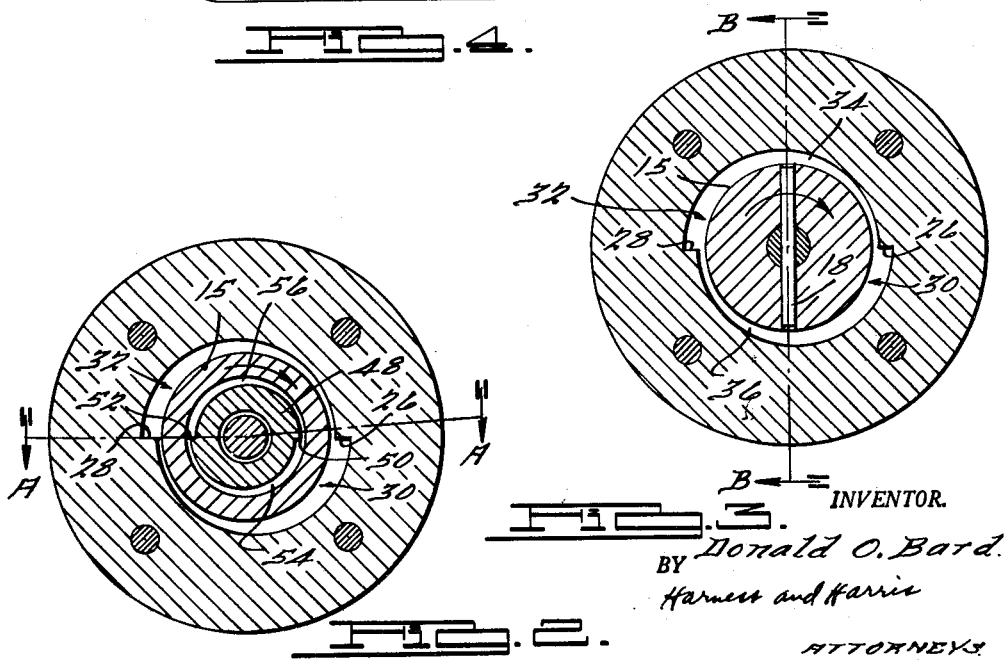
FIG. 3.
FIG. 2.
INVENTOR.
*Donald O. Bard.*
BY *Harness and Harris*
ATTORNEYS

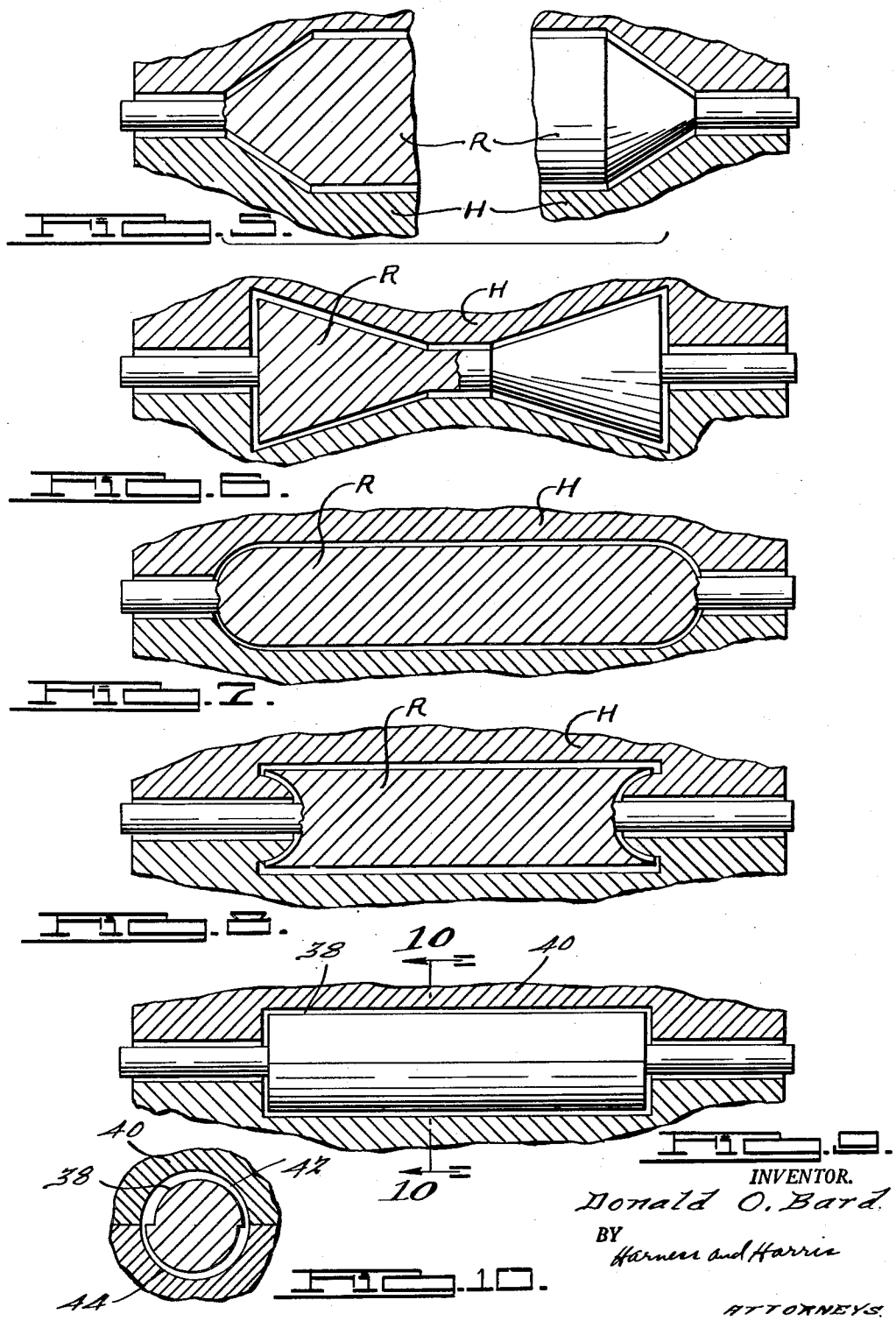

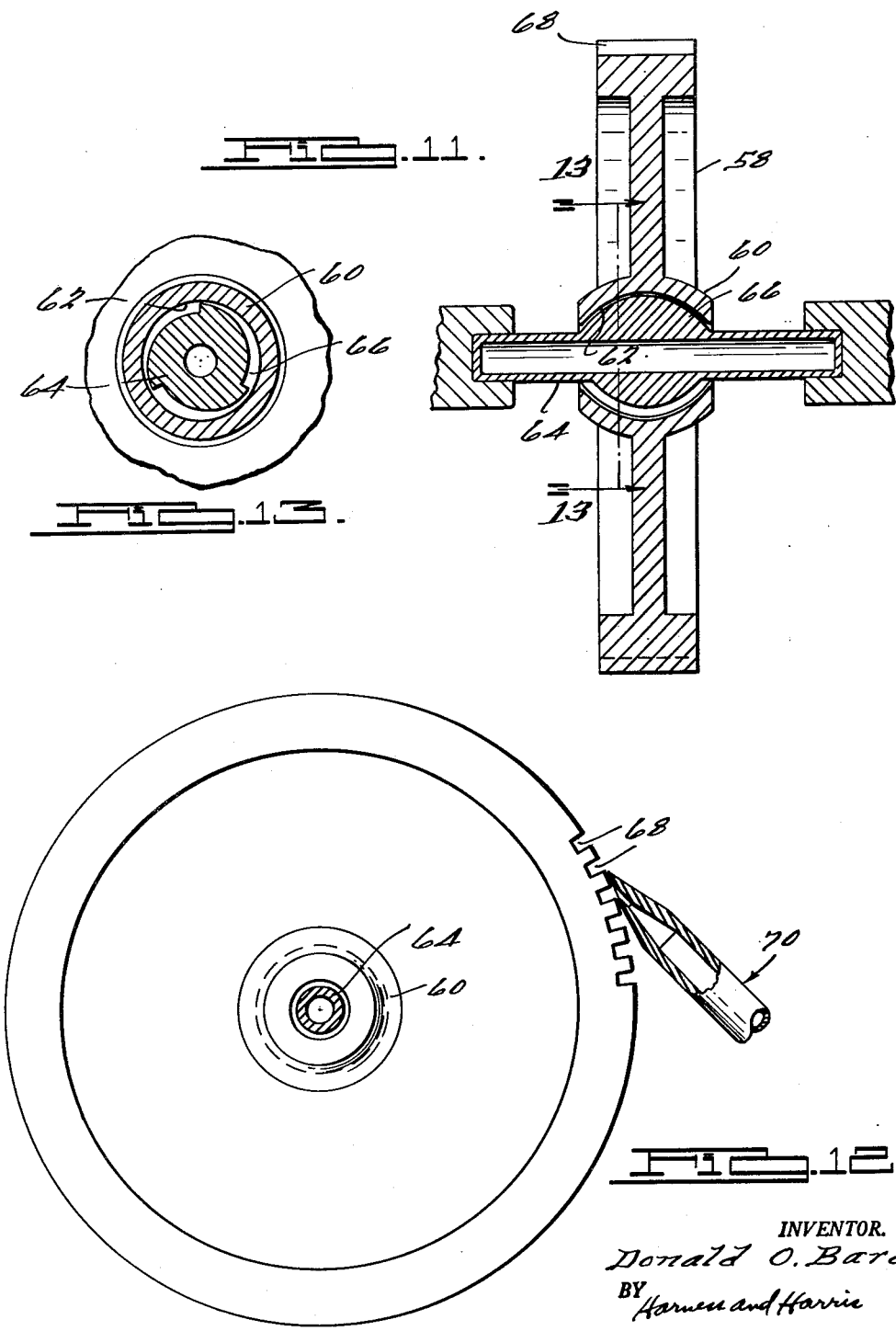

United States Patent Office
3,043,635
Patented July 10, 1962

3,043,635
AIR BEARINGS
Donald O. Bard, Mount Clemens, Mich., assignor to Chrysler Corporation, Highland Park, Mich., a corporation of Delaware
Filed Feb. 1, 1960, Ser. No. 5,715
3 Claims. (Cl. 308—9)

This invention relates to air bearings which may be used in apparatus such a gyroscopes wherein a minimum of frictional bearing resistance is required and also wherein a substantially complete absence of frictional heat is required.

The air bearing of the present invention is of a type which does not use any source of compressed air or any compressed gas other than that air which is naturally in the space between the rotor and housing. The fundamental concept of such a type of bearing is disclosed and claimed in the copending application of Henry F. McKenney filed February 11, 1960, Serial No. 8,173, and this application is concerned with refinements thereof.

In this invention, either of the relatively movable members, that is, the rotor or the housing, may be provided with offset peripheral portions to provide wedge-shaped, air compression spaces between the members which spaces cause the rotor to be suspended on an air cushion within its housing when a certain speed of rotation of the rotor is attained. The same result is attained when the housing is made the rotatable member.

This invention also includes the feature of offset peripheral portions on either the end of the rotor or the inner ends of the housing bore to form the necessary wedge-shaped compression spaces to provide thrust air bearings for preventing engagement of the end portions of the rotor with the housing when predetermined speeds of rotation of the rotor or housing are attained.

It is noted that the compression pockets will become filled with whatever fluid surrounds the system utilizing these bearings, for example water or oil, and the rotor will be supported on a cushion of that particular fluid in the same manner as though the fluid were a gas. However, gases provide an attractive medium for gyroscopic application and because of this, particular emphasis is directed thereto in this application.

A significant advantage over the prior art types of air bearings is that the present bearing requires no outside source of compressed air, but, instead compresses its own air for floating the rotor within the housing. Since the rotor actually does float within the housing there is no frictional engagement of the rotor therewith and the heat developed by the bearing is practically non-existent.

A further advantage of the wedge bearing configuration is that the clearance between the rotor and stator may be set larger than in a conventional air bearing and yet attain equivalent stiffness. Because of this, it is expected that substantial manufacturing economies may be expected through the use of the wedge bearing.

Another advantage is that the manufacturing tolerances of the present bearing do not have to be held as close as those of a conventional bushing type bearing.

A further advantage is that the present bearing provides increased bearing stiffness over other types of hydrodynamic air bearings in that the relative deflection of the rotor and housing is minimized.

A principal object of this invention is to provide novel type of air bearing which does not require any exterior source of compressed air or gas for its operation.

A specific object is to provide a fluid bearing for axially and radially suspending a rotor on a fluid cushion within its housing.

A further specific object is to provide offset peripheral portions on either the rotor or the housing or on both to produce wedge-shaped fluid compression pockets intermediate the relatively rotatable rotor and housing.

Further objects and advantages of this invention will become apparent from the following description of the drawings in which:

FIGURE 1 represents a partial cross-sectional view of an electric motor having its rotor mounted on air bearings, wherein the section line of the right hand bearing is taken along a line corresponding to line A—A of FIGURE 2 in the direction of the arrows, and the section line of the left hand bearing is taken along a line corresponding to B—B of FIGURE 3 in the direction of the arrows;

FIGURE 2 represents an enlarged cross-sectional view of an air bearing of FIGURE 1 taken along the line 2—2 in the direction of the arrows;

FIGURE 3 represents a cross-sectional view of an air bearing of FIGURE 1 taken along the line 3—3 in the direction of the arrows;

FIGURE 4 represents an isometric view of the central and end mating portions of the air bearing housing;

FIGURES 5 through 8 represent variations in the general contour design of the rotor and housing structure of FIGURE 1;

FIGURE 9 represents a variation of the bearing of FIGURE 1;

FIGURE 10 represents a cross-sectional view of the bearing of FIGURE 9 taken along the line 10—10 thereof in the direction of the arrows;

FIGURE 11 represents a cross-sectional view of a gyroscope provided with a wedge-shaped air bearing;

FIGURE 12 represents a partially broken away side view of the gyroscope of FIGURE 11; and FIGURE 13 represents a cross-sectional view of the gyroscope of FIGURE 11 taken along the line 13—13 thereof in the direction of the arrows.

Referring to FIGURE 1, the shaft 11 of an electric motor or electrically driven gyroscope designated 12 is provided at its ends with air bearings 14 and 16 shown in enlarged form for purposes of clarity. Shaft 11 extends between air bearings 14 and 16 and may be formed integrally with the rotors 15 of the bearings or may be secured to the rotors by suitable means such as pins 18. The winding 20 of the motor may be fitted onto the shaft 11 before the bearings 14 and 16 are fitted thereon.

Each of the bearings 14 and 16 comprises a central housing portion 22, end housing portions 24, and a core member or rotor 15. Either the housing or the rotor may be made the rotatable member for certain applications. The particular member which rotates is not critical to the present invention since the same fluid pressure between the two will be developed.

In FIGURE 3, the structure of the central portion of the housing and rotor is shown to comprise the substantially round rotor member 15, and the peripherally offset housing portion 22. The peripheral offsets 26 and 28 may be produced by boring out the housing 22, dividing it into halves, and thereafter offsetting them slightly along their longitudinal axes to produce the offsets and the wedge-shaped pockets 30 and 32. Another method would be to broach the inside of the housing to the desired shape. The pockets 30 and 32 are shown to be of arcuate wedge-shape with the greatest area adjacent the offsets 26 and 28.

The rotation of the rotor 15 clockwise in FIGURE 3 will cause a relatively high pressure to be developed in the areas approximately designated 34 and 36, which are directly opposite one another along the diameter of the rotor 15 and therefore result in an actual suspension on air of the rotor within its housing. The speed of rotation at which the rotor 15 becomes actually suspended on an air cushion is dependent upon the size of air pockets 30 and 32, the weight and speed of rotation of the rotor 15, and upon other factors which are of only minor importance, such as gas density. However, if a heavier fluid such as oil is employed as the surrounding medium, its density becomes quite significant.

It is particularly noted that the offsets need not be on the housing 22 but, as shown in FIGURES 9 and 10, may be on the periphery of the rotor designated 38 in those figures. The direction of rotation of the rotor in this case to produce necessary pressures for suspending the rotor 38 would be counterclockwise and the high pressure areas would be constantly moving relative to the housing 40 but would be substantially constant along the rotor periphery at the approximate points 42 and 44. In other words, the particular member which moves and its direction of rotation are matters of choice if the net effect of the relative rotation of the two members is to produce within the air pockets pressures necessary to lift the rotor from the bore of the housing, and it would be within the skill of those experienced in the art to further devise modifications and variations in the specific design of the peripheries of either the rotor or the housing without deviating from the scope of this invention. For example, a plurality of offsets could be equidistantly spaced on either the rotor or the housing to produce the pressures required for certain applications. Moreover, in some instances it might be convenient to provide both the rotor and its housing with offsets in their peripheries.

Each end of the rotor 15 is provided with a conical recess 46 which has a substantially smooth surface. On the other hand, the end portions 24 of the housing are provided with conical projections 48 which are provided along their surfaces with offset portions 50 and 52 corresponding to the offset portions 26 and 28 of the housing portion 22. These offsets 50 and 52 form wedge-shaped pockets 54 and 56 in which pressure is built up by rotation of the shaft in a clockwise direction to cushion or suspend the shaft from the conical end portions 48.

In FIGURES 5 through 8, it is seen that the rotor generally designated R, and its housing generally designated H can have any shape so long as their adjacent side and end surfaces are spaced a predetermined distance and provided with the necessary offset portions to produce the wedge pockets corresponding to the side pockets 30, 32 and end pockets 54, 56 of bearings 14 and 16. As shown in FIGURE 5, the length of the bearing can be of any desired length. Moreover, the offsets for either the side or end bearings can be as aforesaid, either on the rotor or on the housing, and the direction in which these pockets narrow down can be chosen to correspond to the desired direction of rotation of either the rotor or the housing.

It is particularly noted that the air pockets shown in the drawings are considerably oversized for purposes of description. In actual construction the largest cross-sectional dimension of these pockets is normally below five-thousandths and the problem of excessive frictional engagement of the rotor with the housing at low rotor speeds is not significant even when the rotor rides directly on the housing.

Referring to FIGURES 11 through 13, a gyroscope rotor 58 is provided with a hub portion 60 having a smooth inner surface 62. This surface may be round as shown, or oval, depending on the degree of drift of the rotor allowable for the particular application. It is noted that the oval shape would retard rotor drift from the center position of the rotor. A shaft 64 having a shape corresponding to the surface 62 of the rotor is provided with successive and equally spaced wedge-shaped surface portions 66 in which air pressure will be developed as the rotor rotates counterclockwise in FIGURE 13 in the same manner as air pressure is developed in the devices of FIGURES 1 through 10. The shaft 64 may be made hollow as shown in FIGURES 11 and 12 to reduce the weight of the gyroscope device. The outer periphery of the rotor may be provided with spaced teeth 68 against which air from air jet 70 may be directed to provide the necessary driving force for the rotor.

The particular manner in which the rotor is driven is not critical, and various other ways conventional to the art may be provided to impart the necessary driving force to the rotor.

The number of wedge-shaped portions on the shaft 64 may be increased or decreased depending upon the particular application. Moreover, these wedge-shaped portions may be provided on either the rotor hub 60 or the shaft as shown or on both, as described above with reference to the device of FIGURES 1 through 10.

In the claims:

1. A gas lubricated bearing comprising a rotatable member having a radial surface portion and a tapered thrust surface portion, a housing member substantially enclosing said rotary member with a mechanical clearance therefrom, said housing member having side and end portions, each of said side and end portions having a pair of lands operable to form arcuate, wedge-shaped pockets with said radial and thrust surface portions of said rotatable member in the direction of rotation thereof, each of said pairs of lands approaching diametrically aligned points of tangency with a different one of the aforesaid surface portions of said rotatable member.

2. A gas lubricated bearing comprising a rotatable member having a radial surface portion and a tapered cut-out thrust surface portion, a housing member substantially enclosing said rotatable member and having a mechanical clearance therefrom, said housing member having a plurality of lands extending along said radial surface portion of said rotatable member and a like plurality of lands surrounding said tapered thrust surface portion thereof, said lands operable to form with said surface portions of said rotatable member a plurality of arcuate, wedge-shaped pockets, said lands proximate said radial surface portion of said rotatable member and said lands proximate said thrust surface portion of said rotatable member approaching radially aligned points of tangency with said radial and said thrust surface portions of said rotatable member, respectively.

3. A gas lubricated bearing comprising a rotatable member having a radial surface portion and a conically cut-out thrust surface portion, a housing member substantially enclosing said rotatable member and having a mechanical clearance therefrom, said housing member having a plurality of lands formed thereon and extending proximate said radial surface and said thrust surface portions of said rotatable member, said lands proximate said radial surface portion and said lands proximate said thrust surface portion being formed similarly eccentric to the center of rotation of said rotatable member and operable to form with said surface portions of said rotatable member a plurality of arcuate, wedge-shaped pockets in the direction of rotation of said rotatable member, said lands proximate said radial surface portion of said rotatable member and said lands proximate said thrust surface portion of said rotatable member approaching radially aligned points of tangency with said radial and said thrust surface portions of said rotatable member, respectively.

References Cited in the file of this patent

UNITED STATES PATENTS

| | | |
|---|---|---|
| 2,093,521 | Howarth | Sept. 21, 1937 |
| 2,684,272 | Annen | July 20, 1954 |
| 2,899,243 | Acterman | Aug. 11, 1959 |
| 2,899,260 | Farrand et al. | Aug. 11, 1959 |